(12) United States Patent
Shi et al.

(10) Patent No.: US 9,008,357 B2
(45) Date of Patent: Apr. 14, 2015

(54) TARGET DETECTION METHOD AND APPARATUS AND IMAGE ACQUISITION DEVICE

(75) Inventors: Danwei Shi, Guangdong (CN); Kun Zhou, Guangdong (CN)

(73) Assignee: Shenzhen Taishan Online Technology Co., Ltd., Shenzhen, Guangdong (CN)

(*) Notice: Subject to any disclaimer, the term of this patent is extended or adjusted under 35 U.S.C. 154(b) by 553 days.

(21) Appl. No.: 13/382,140

(22) PCT Filed: Mar. 5, 2010

(86) PCT No.: PCT/CN2010/070879
§ 371 (c)(1),
(2), (4) Date: Jan. 3, 2012

(87) PCT Pub. No.: WO2011/000225
PCT Pub. Date: Jan. 6, 2011

(65) Prior Publication Data
US 2012/0106799 A1   May 3, 2012

(30) Foreign Application Priority Data
Jul. 3, 2009   (CN) .......................... 2009 1 0108166

(51) Int. Cl.
*G06K 9/46* (2006.01)
*G06T 7/00* (2006.01)
*G06K 9/32* (2006.01)

(52) U.S. Cl.
CPC ............ *G06T 7/0081* (2013.01); *G06K 9/3241* (2013.01); *G06T 7/0097* (2013.01); *G06T 2207/10152* (2013.01); *G06T 2207/20144* (2013.01); *G06T 2207/20224* (2013.01)

(58) Field of Classification Search
None
See application file for complete search history.

(56) References Cited

U.S. PATENT DOCUMENTS

| | | | |
|---|---|---|---|
| 7,023,481 B1* | 4/2006 | Watanabe et al. | 348/297 |
| 7,334,901 B2* | 2/2008 | El-Ghoroury | 353/94 |
| 7,831,086 B2* | 11/2010 | Kondo et al. | 382/154 |
| 8,174,563 B2* | 5/2012 | Saito | 348/47 |
| 8,666,127 B1* | 3/2014 | Kim et al. | 382/127 |
| 2002/0047898 A1* | 4/2002 | Mindl et al. | 348/113 |
| 2003/0072470 A1* | 4/2003 | Lee | 382/103 |
| 2004/0105573 A1* | 6/2004 | Neumann et al. | 382/103 |
| 2004/0184670 A1* | 9/2004 | Jarman et al. | 382/274 |
| 2004/0190752 A1* | 9/2004 | Higaki et al. | 382/103 |
| 2004/0240747 A1* | 12/2004 | Jarman et al. | 382/274 |
| 2005/0041102 A1* | 2/2005 | Bongiovanni et al. | 348/155 |
| 2005/0196044 A1* | 9/2005 | Nagahashi et al. | 382/190 |
| 2006/0182326 A1* | 8/2006 | Schildkraut et al. | 382/132 |
| 2007/0003164 A1* | 1/2007 | Takata et al. | 382/284 |

(Continued)

FOREIGN PATENT DOCUMENTS

KR   20080051645 A   6/2008
WO   2007025578 A1   3/2007

*Primary Examiner* — Chan Park
*Assistant Examiner* — Mia M Thomas
(74) *Attorney, Agent, or Firm* — Morris Manning & Martin LLP; Tim Tingkang Xia, Esq.

(57) ABSTRACT

A target detection method including the following steps controlling a modulated light emitting device to emit optical pulse signals with a first light intensity and a second light intensity to a target to be detected and a background, controlling an image sensor to acquire images of the target to be detected and the background, and distinguishing the target to be detected and the background, using the first frame image and the second frame image.

12 Claims, 6 Drawing Sheets

(56) References Cited

U.S. PATENT DOCUMENTS

2007/0098303 A1* 5/2007 Gallagher et al. ............ 382/305
2007/0237363 A1* 10/2007 Hagio et al. .................. 382/106
2007/0269078 A1* 11/2007 Lee ............................... 382/103
2009/0167857 A1* 7/2009 Matsuda et al. .............. 348/143
2010/0183224 A1* 7/2010 Park et al. ..................... 382/169

* cited by examiner

TARGET DETECTION METHOD AND APPARATUS AND IMAGE ACQUISITION DEVICE

FIELD OF THE INVENTION

The present invention relates to a target detection field, more specifically, to a target detection method and apparatus and used image acquisition device thereof.

BACKGROUND OF THE INVENTION

Target detection technology widely applied in many fields has always been an important research subject in image processing and computer vision. As a front end processing link, the target detection is one key technology and difficult problem. Only the target in a scene is detected timely, a series of processing work in the following such as target tracking and identifying can be implemented smoothly.

Since target detection technology is very susceptible to the external light especially for sunlight, when a target detection apparatus is used outside, the measurement accuracy will be seriously affected with the detected target in the presence of relatively strong background light, especially under the perpendicular incidence of sunlight or strong light. In addition, positional deviation caused by the shaking and movement of the target to be detected would bring about great impact on the detection accuracy during detection.

How to prevent the relatively strong light from interfering the target detection as well as how to reduce the deviation for the target detection during movement have always been a bottleneck problem and technical difficulty to be solved which puzzle and restrict the practicality of target detection system. Right now, great attention has been paid by domestic and foreign experts to it, and thorough and broad studies have been carried out on such subject. In the present invention, solutions are put forward mainly aiming at such two challenges.

In the prior art, there are three kinds of technical solutions to prevent the sunlight interference and the influence of target movement in the target detection technology, all of which are relevant to the present invention.

In a first method, an additional filter clogging plate or a sunlight occlusion device is utilized. A China patent with application number of No. 200820052299 provides a light curtain that can be used under the sunlight outside. The light curtain comprises a microcontroller which is connected with an IR receiver and an IR transmitter respectively. The body of the IR receiver is provided with a dimmer on its front side so as to filter out visible light as well as reserve IR and far IR signals. However, the above mentioned method cannot solve problems by the root and eliminate the influence of moving objects on the target detection. Besides, the filtrating would cause a decrease of the sensitivity as well. As such, the system has to improve the transmitting power to offset the decrease of sensitivity induced by filtering. In addition, the additional filter clogging plate or the occlusion device to the system will lead to an increase in cost and inconvenience in use.

In a second method, it is a target detection method based on background subtraction method. The basic idea for the background subtraction method is as follows: an average of one or several images in the background is selected to be a background image firstly; then take difference between a current frame and the background, and the obtained difference image is processed appropriately; if the obtained pixel number is larger than a certain threshold value, then a target is determined to be in the background. In this way, the target can be extracted precisely. However, such method is susceptible to many factors including illumination in the background and the movement of background object, as such the produced shadow of moving object will considerably influence the detection accuracy.

The third method is a three-frame difference method. A China patent with application number of No. 200610021067 discloses a moving target detection method in infrared image sequence in complex background, which belongs to the technical field of digital image processing. At first, calculation is performed to obtain difference images of a previous frame and a current frame as well as a current frame and a next frame in the infrared image sequence respectively. After that, a respective change detection template is extracted from the two difference images. Subsequently, a union operation is carried out on the two change detection templates, and their intersection is taken as a moving target template. Finally, a connected component labeling is implemented to the moving target template to obtain the moving target. Wherein the extract of the change detection template specifically comprises: extracting an original change detection template by estimating noise parameters for the difference images in a manner of iteration from both ends of a column diagram to its centre; employing a morphologic processing mode including performing an and operation on small structural units after their erosion and dilation and performing a closing operation on large structural units; wherein the noise parameters for the difference images comprise mean values and variances. Although the three-frame difference method can eliminate the target deviation produced during movement effectively and achieve relatively precise moving target detection, it has not resolved the impact of strong light interference on the target detection. Besides, the algorithm is complex in implementation, in which it is needed to carry out a great deal of morphologic processing to the image to reduce noise in the last period.

During the detection for moving target, the sweep time also has great influence on the detection result. In the detection methods as described above and any other detection methods, it usually takes about 15 ms to scan one frame image. However, the moving object may have experienced large replacement in such time period. Thus, the image acquired in this way and the post image processing will have great deviation.

SUMMARY OF THE INVENTION

The objective of the present invention is to precisely detect a target object in strong light background, reduce the deviation caused by object movement and provide a target detection method and apparatus and used image acquisition device thereof, aiming at the disadvantages that the above systems are high in cost, complex and large in deviation in the prior art.

The technical solution which is utilized to solve the technical problem in the present invention is as follows: dividing an image sensor into a plurality of image acquisition regions, wherein two consecutive scans are performed on the same image acquisition region respectively in the first light intensity and in the second light intensity to obtain a first light intensity image and a second light intensity image, and distinguishing a target to be detected from a background according to the first light intensity image and the second light intensity image.

A target detection method is provided in the present invention which comprises the following steps:

controlling a modulated light emitting device to emit light pulse signals with a first light intensity and a second light intensity to a target to be detected and a background, wherein the first light intensity is not equal to the second light intensity, and the capabilities of reflecting the light pulse signals of the target to be detected and the background are different;

controlling an image sensor to acquire images of the target to be detected and the background, wherein the image sensor comprises a plurality of image acquisition regions, wherein two consecutive scans are performed on the same image acquisition region respectively in the first light intensity and in the second light intensity to obtain a first light intensity image and a second light intensity image which are then stored in corresponding locations in a first frame image and a second frame image respectively;

obtaining the first frame image and the second frame image after finishing the scanning for the plurality of image acquisition regions and distinguishing the target to be detected and the background by means of the first frame image and the second frame image.

In the target detection method of the present invention, the plurality of image acquisition regions are arranged continuously and correspond to a positive integral number of pixel lines or pixel rows of the image sensor respectively.

In the target detection method of the present invention, the distinguishing the target to be detected and the background is achieved through a difference image obtained by subtracting the first frame image from the second frame image.

Another target detection method is provided in the present invention, which comprises the following steps:

controlling a modulated light emitting device to emit light pulse signals with a first light intensity and a second light intensity to a target to be detected and a background, wherein the first light intensity is not equal to the second light intensity, and the capabilities of reflecting the light pulse signals of the target to be detected and the background are different;

controlling an image sensor to acquire images of the target to be detected and the background, wherein the image sensor comprises a plurality of image acquisition regions, wherein two consecutive scans are performed on the same image acquisition region respectively in the first light intensity and in the second light intensity to obtain a first light intensity image, a second light intensity image and a difference image of the first light intensity image and the second light intensity image, and the difference image are then stored in a corresponding location in a frame difference image;

obtaining the frame difference image after finishing the scanning for the plurality of image acquisition regions and distinguishing the target to be detected and the background by means of the frame difference image.

In the another target detection method of the present invention, the plurality of image acquisition regions are arranged continuously and correspond to a positive integral number of pixel lines or pixel rows of the image sensor respectively.

A target detection apparatus is also provided in the present invention, comprising:

a modulated light emitting device, for emitting light pulse signals with a first light intensity and a second light intensity to a target to be detected and a background, wherein the first light intensity is not equal to the second light intensity, and the capabilities of reflecting the light pulse signals of the target to be detected and the background are different;

an image sensor, for acquiring images of the target to be detected and the background, wherein the image sensor comprises a plurality of image acquisition regions; and a control unit, for controlling the image sensor to perform two consecutive scans on the same image acquisition region respectively in the first light intensity and in the second light intensity to obtain a first light intensity image and a second light intensity image which are then stored in corresponding locations in a first frame image and a second frame image; obtaining the first frame image and the second frame image after finishing the scanning for the plurality of image acquisition regions and distinguishing the target to be detected and the background by means of the first frame image and the second frame image.

In the target detection apparatus of the present invention, the plurality of image acquisition regions are arranged continuously and correspond to a positive integral number of pixel lines or pixel rows of the image sensor respectively.

In the target detection apparatus of the present invention, the distinguishing the target to be detected and the background is achieved through a difference image obtained by subtracting the first frame image from the second frame image.

Another target detection apparatus is provided in the present invention, comprising:

a modulated light emitting device, for emitting light pulse signals with a first light intensity and a second light intensity to a target to be detected and a background, wherein the first light intensity is not equal to the second light intensity, and the capabilities of reflecting the light pulse signals of the target to be detected and the background are different;

an image sensor, for acquiring images of the target to be detected and the background, wherein the image sensor comprises a plurality of image acquisition regions; and a control unit, for controlling the image sensor to perform two consecutive scans on the same image acquisition region respectively in the first light intensity and in the second light intensity to obtain a first light intensity image, a second light intensity image and a difference image of the first light intensity image and the second light intensity image; storing the obtained difference image in a corresponding location in a frame difference image; obtaining the frame difference image after finishing the scanning for the plurality of image acquisition regions and distinguishing the target to be detected and the background by means of the frame difference image.

In the another target detection apparatus of the present invention, the plurality of image acquisition regions are arranged continuously and correspond to a positive integral number of pixel lines or pixel rows of the image sensor respectively.

An image acquisition device is also provided in the present invention, comprising:

a modulated light emitting device, for emitting light pulse signals with a first light intensity and a second light intensity to a target to be detected and a background, wherein the first light intensity is not equal to the second light intensity, and the capabilities of reflecting the light pulse signals of the target to be detected and the background are different;

an image sensor, for acquiring images of the target to be detected and the background, wherein the image sensor comprises a plurality of image acquisition regions; and a control unit, for controlling the image sensor to perform two consecutive scans on the same image acquisition region respectively in the first light intensity and in the second light intensity to obtain a first light intensity image and a second light intensity image.

In the image acquisition device of the present invention, the control unit is further used for storing the first light intensity image and the second light intensity image in corresponding locations in a first frame image and a second frame image.

In the image acquisition device of the present invention, the control unit is further used for forming a difference image of the first light intensity image and the second light intensity image and storing the difference image into a corresponding location in a frame difference image.

In the image acquisition device of the present invention, the plurality of image acquisition regions are arranged continuously and correspond to a positive integral number of pixel lines or pixel rows of the image sensor respectively.

When implementing the target detection method and apparatus and used image acquisition device thereof in the present invention, the following advantageous effects can be achieved: since the capabilities of reflecting the light pulse signals of the target to be detected and the background are different, the target to be detected can be distinguished from the background very well so as to reduce the influence of strong light on the target to be detected. Meanwhile, a partitioned consecutive scanning mode is employed in the present invention, which ensures the time slot between two scans for every region to be very small. During this time, the displacement deviation of the moving target to be detected is very small, so that a common image sensor can be used for detecting the target or even the moving target precisely. Therefore, in the present invention, there is no need of professional high-speed camera, thus reducing the cost greatly and improving the equipment performance.

BRIEF DESCRIPTION OF THE DRAWINGS

The present invention is further described with reference to the accompanying drawings and embodiments in the following. In the figures.

DETAILED DESCRIPTION OF THE PREFERRED EMBODIMENT

Figure 1:
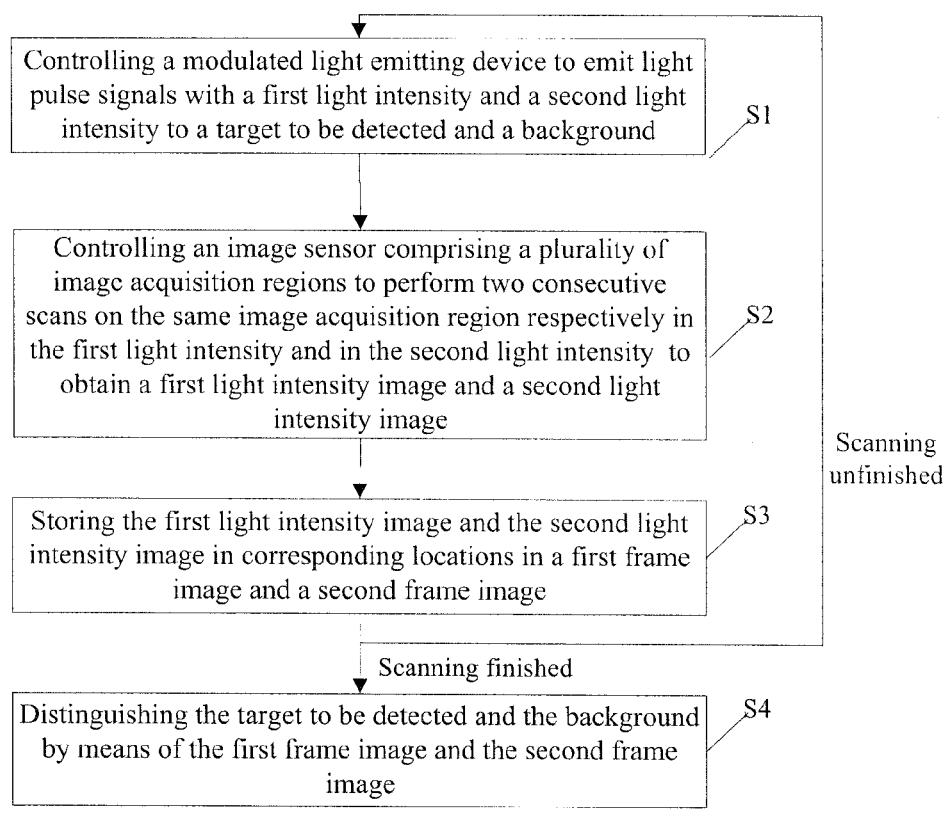
FIG. 1 is a flowchart for the target detection method according to the first embodiment of the present invention.

As shown in FIG. 1, it is a flowchart for the target detection method according to the first embodiment of the present invention, which comprises the following steps:

in step S1, a modulated light emitting device is controlled to emit light pulse signals with a first light intensity and a second light intensity to a target to be detected and a background, wherein the first light intensity is not equal to the second light intensity, and the capabilities of reflecting the light pulse signals of the target to be detected and the background are different. The difference in the capabilities of reflecting may be due to the differences in reflectivity, distance, or other factors affecting the capabilities of reflecting. In the present embodiment, in order to improve the capabilities of reflecting, a layer of high-performance reflective material is coated on the surface of the target to be detected, or a reflector film, such as an aluminized reflector mylar etc. is directly attached thereon.

In step S2, an image sensor is controlled to acquire images of the target to be detected and the background. The image sensor comprises a plurality of image acquisition regions. And two consecutive scans are performed on the same image acquisition region respectively in the first light intensity and in the second light intensity to obtain a first light intensity image and a second light intensity image.

In step S3, the first light intensity image and the second light intensity image are stored into corresponding locations in a first frame image and a second frame image respectively. Meanwhile, it is detected whether the scanning is finished; if not, then turn to the step S1 to scan a next region.

In step S4, the first frame image and the second frame image are obtained after the scanning for the plurality of image acquisition regions is finished, and the target to be detected is distinguished from the background by means of the first frame image and the second frame image.

In the method provided by the present invention, as the capability of reflecting the light pulse signals of the target to be detected is stronger than that of the background, the regional grey scales for the target to be detected imaged in the first light intensity and in the second light intensity are quite different. However, the regional grey scales for the background imaged in two light intensities have little difference. As such, by way of a corresponding image identifying method such as the difference image obtained from the subtraction between the second frame image and the first frame image, the target to be detected can be distinguished from the background successfully.

Figure 2:
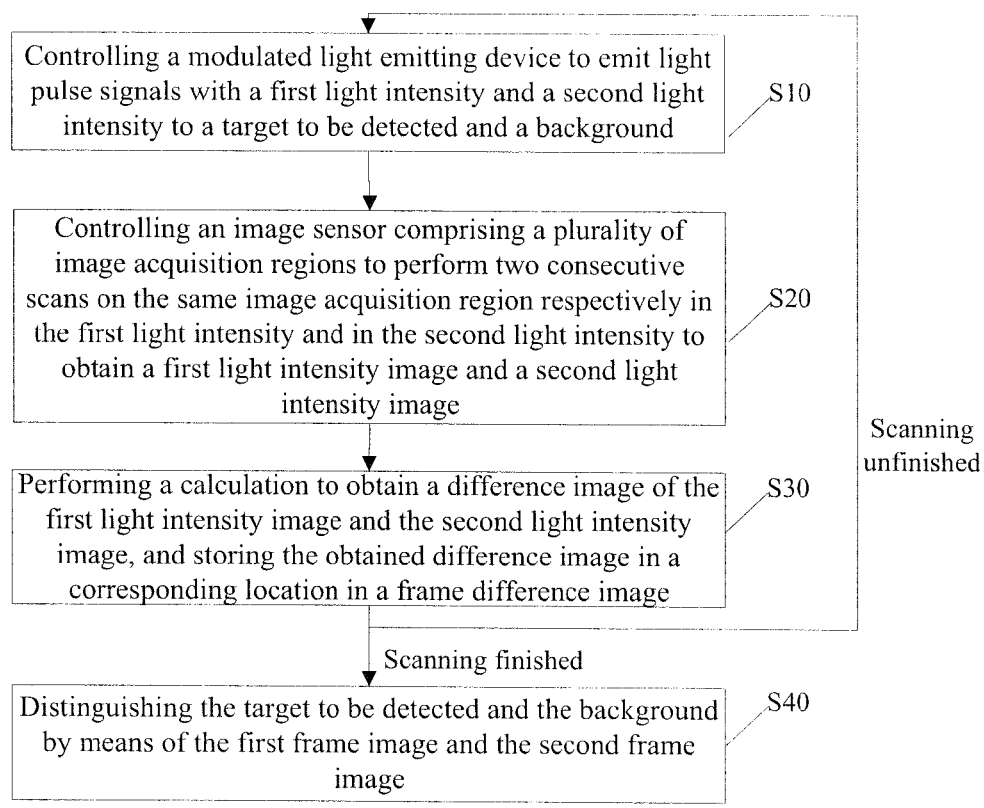
FIG. 2 is a flowchart for the target detection method according to the second embodiment of the present invention.

As shown in FIG. 2, it is a flowchart for the target detection method according to the second embodiment of the present invention, which comprises steps S10, S20, S30 and S40. Such steps correspond to the steps S1, S2, S3 and S4 in the first embodiment respectively. The only difference lies in that: in step S30, a calculation is performed to obtained a difference image of the first light intensity image and the second light intensity image, and the obtained difference image is stored in a corresponding location in a frame difference image; meanwhile, it is detected whether the scanning is finished, if not, turn to the S10 to scan a next region; in step S40, the frame difference image is obtained after the scanning for the plurality of image acquisition regions is finished, and the target to be detected is distinguished from the background by means of the frame difference image.

Figure 3:
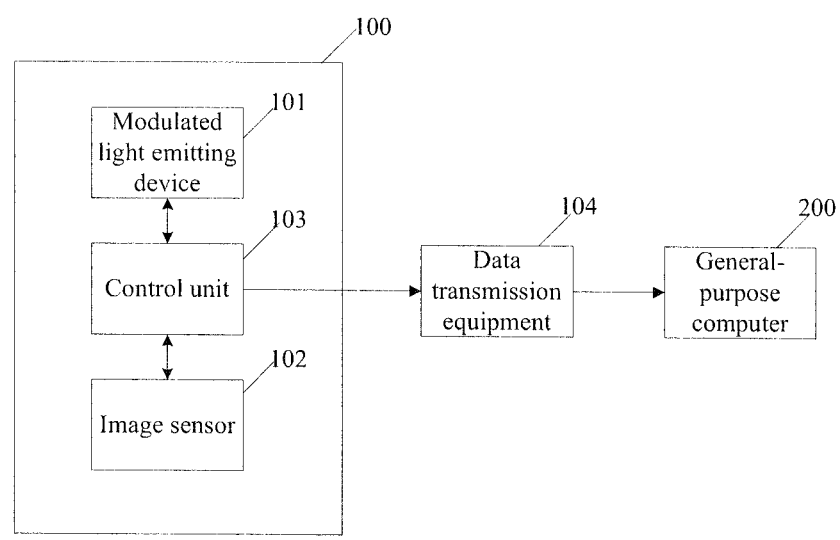
FIG. 3 is a structure diagram for the target detection apparatus or the image acquisition device in the present invention.

As shown in FIG. 3, a target detection apparatus 100 is also provided in the present invention, which comprises a modulated light emitting device 101, an image sensor 102 and a control unit 103. Wherein, the modulated light emitting device 101 is used for emitting light pulse signals with a first light intensity and a second light intensity to a target to be detected and a background, wherein the first light intensity is not equal to the second light intensity, and the capabilities of reflecting the light pulse signals of the target to be detected and the background are different. The image sensor 102 is used for acquiring images of the target to be detected and the background, wherein the image sensor comprises a plurality of image acquisition regions. The control unit 103 is used for controlling the image sensor to perform two consecutive scans on the same image acquisition region respectively in the first light intensity and in the second light intensity to obtain a first light intensity image and a second light intensity image. The first light intensity image and the second light intensity image are stored in corresponding locations in a first frame image and a second frame image respectively. After the scanning for the plurality of image acquisition regions is finished, the first frame image and the second frame image are obtained, and the target to be detected is distinguished from the background by means of the first frame image and the second frame image. In an embodiment, the control unit 103 can distinguish the target to be detected from the background through the difference image obtained by subtracting the first frame image from the second frame image.

In another embodiment, a target detection apparatus has the same structure as that mentioned above, in which the functions of the modulated light emitting device 101 and the image sensor 102 are the same as those mentioned above as well. The only difference lies in that: the control unit 103 controls the image sensor to perform two consecutive scans on the same image acquisition region respectively in the first light intensity and in the second light intensity to obtain a first light intensity image, a second light intensity image and a difference image of the first light intensity image and the second light intensity image; the obtained difference image is stored in a corresponding location in a frame difference image; after the scanning for the plurality of image acquisition regions is finished, the frame difference image is obtained and the target to be detected is distinguished from the background by means of the frame difference image.

An image acquisition device is also provided in the present invention, of which the structure is the same as that of the above-mentioned target detection apparatus, and in which the functions of the modulated light emitting device 101 and the image sensor 102 are the same as those mentioned above. The only difference lies in that: the control unit 103 controls the image sensor 102 to perform two consecutive scans on the same image acquisition region respectively in the first light intensity and in the second light intensity to obtain a first light intensity image and a second light intensity image.

Both the above mentioned target detection apparatus and the image acquisition device can be connected with a data transmission equipment 104, so that the results of target detection or image acquisition may be transmitted to a general-purpose computer 200 for subsequent processing.

It should be noted that the first light intensity and the second light intensity in the method, apparatus and device mentioned above are unequal, and the difference value between the two can make them be distinguished from each other during image acquisition. One of the first light intensity and the second light intensity is preferred to be zero so that the difference between the first and the second light intensity reaches the maximum, which facilitates the post image identifying. In the embodiment of the present invention, the second light intensity is selected to be larger than the first light intensity. In the method, apparatus and device of the present invention, the modulated light emitting device 101 may be configured to emit light with different wavelengths, such as infrared light and ultraviolet light and so on, preferably infrared light. In the method, apparatus and device of the present invention, a common CMOS sensor or CCD image sensor may be utilized as the image sensor 102.

Figure 4A:
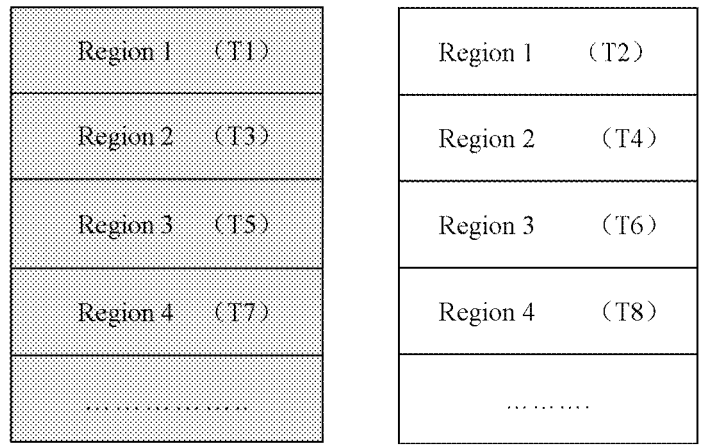
FIGS. 4a-b are schematic diagrams for two kinds of partitioned scanning method of the target detection method in the present invention.
Figure 4B:
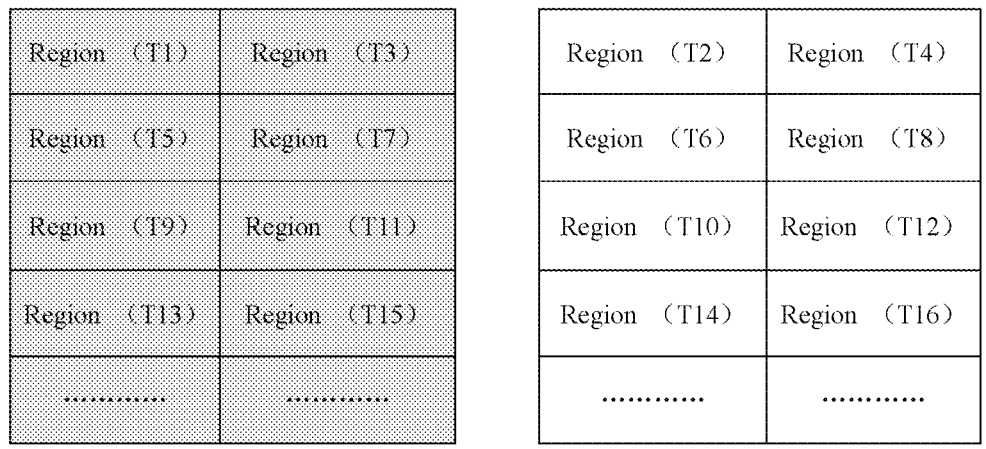

As shown in FIGS. 4a-b, they are schematic diagrams for two kinds of partitioned scanning method of the target detection method in the present invention. As mentioned above, the image sensor of the method and apparatus and used image acquisition device thereof in the present invention comprises a plurality of image acquisition regions. In different embodiments, the divisions of the image acquisition regions may be different as well. Two kinds of specific division methods are listed in the present application, but the division method and quantity of the image acquisition region are not limited in the present invention. That is because when there are two or more than two regions, no matter which shape they are, the time difference between the two image scans which are performed consecutively on each one region respectively in the first light intensity and in the second light intensity is definitely shorter than that in the scenario where all regions are first scanned in the first light intensity and then re-scanned in the second light intensity, so that the displacement of the target to be detected is obviously smaller in the former and correspondingly the detection of the target is more precise. For different divisions of the image acquisition regions and the corresponding exposure modes, it may be needed to customize the relevant image sensor.

As shown in FIG. 4a, regions 1, 2, 3 . . . represent a plurality of image acquisition regions. They are arranged continuously in one direction and correspond to a positive integral number of pixel lines or pixel rows of the image sensor respectively. For example, in the embodiment, all of the regions 1, 2, 3 . . . are with N pixel lines or pixel rows, wherein N is a positive integral number. This is one kind of the simplest implementation which is also suitable for a common image sensor on the market. In this case, the modulated light emitting device 101 respectively emits a first light intensity, a second light intensity, a first light intensity during a successive time period of T1, T2, T3 . . . in turn. Then, the image sensor respectively scans the regions 1, 2, 3 . . . during the successive time period of T1, T2, T3 . . . in turn. Besides, the image scanned in the first light intensity is stored in a first frame image I1 and the image scanned in the second light intensity is stored in a second frame image I2 until the scanning of all the image acquisition regions is finished. At last, the difference image obtained by subtracting the first frame image I1 from the second frame image I2 is the image of the target to be detected. In this way, the time difference for the region 1 between the two frame images is T2−T1, for the region 2 it is T4−T3, and the rest can be done in the same manner. However, if an un-partitioned scanning is carried out here, that is, all the regions are scanned in the first light intensity and then re-scanned in the second light intensity, the time difference for the region 1 between the two frame images is the time taken for scanning a whole image, i.e. $T_{m+1}-T1$; wherein M is the number of the region. It is apparent that such value is larger than that of T2−T1. Therefore, the displacement deviation of the moving object is reduced in the method and apparatus of the present invention.

As shown in FIG. 4b, regions 1, 2, 3 . . . represent a plurality of image acquisition regions which are distributed in two rows. In this case, the regions 1, 3, 5 . . . represent a first region while the regions 2, 4, 6 . . . represent a second region. The modulated light emitting device 101 respectively emits a first light intensity, a second light intensity, a first light intensity . . . during a continuous time period of T1, T2, T3 . . . in turn. Then, the image sensor respectively scans the regions 1, 2, 3 . . . during the continuous time period of T1, T2, T3 . . . in turn. Besides, the image scanned in the first light intensity is stored in a first frame image I1 and the image scanned in the second light intensity in a second frame image I2 until the scanning of all the image acquisition regions is finished. At last, the difference image obtained by subtracting the first frame image I1 from the second frame image I2 is the image of the target to be detected.

Figure 5:
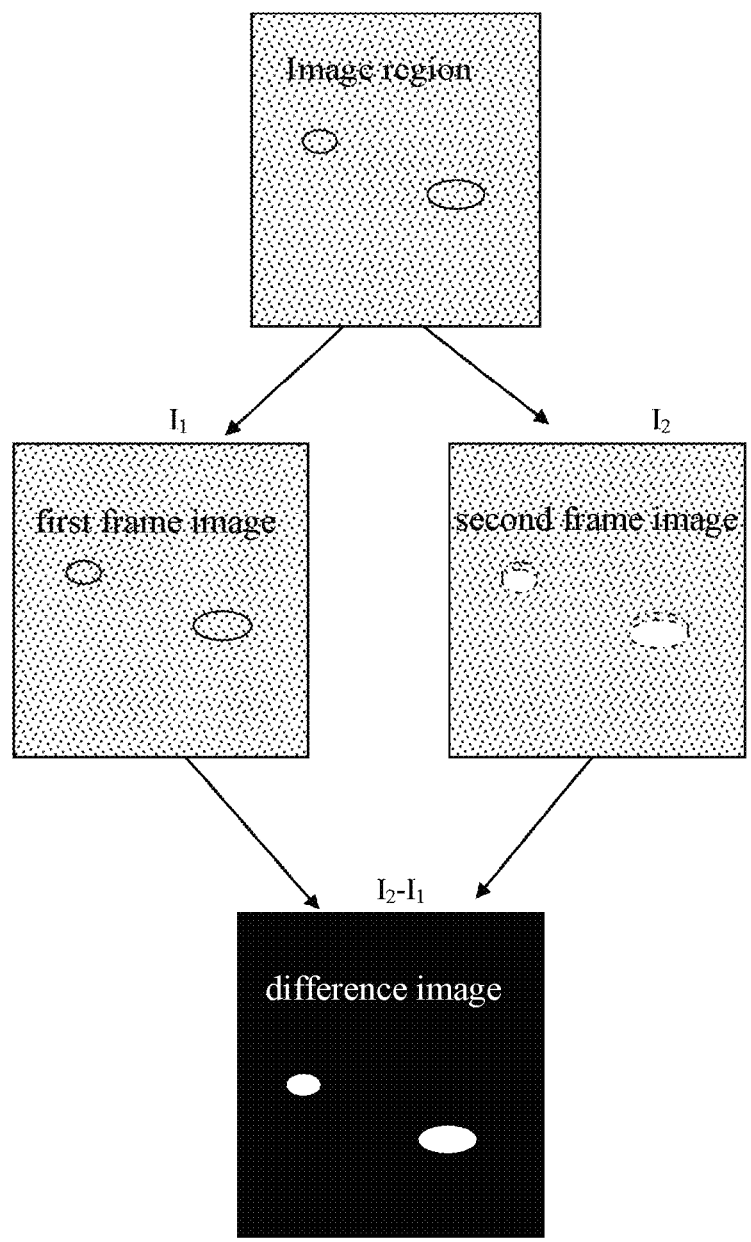
FIG. 5 is a schematic diagram for the process of the target detection method in the present invention.

FIG. 5 is a schematic diagram for the process of the target detection method in the present invention. As mentioned above, that is, after the first frame image I1 and the second frame image I2 are obtained, the difference image obtained by subtracting the first frame image I1 from the second frame image I2 is the image of the target to be detected.

It should be noted that:

(1) With reference to the FIGS. 4a-b, we can see that I2−I1 is actually the subtraction between the corresponding regions respectively in the two frame images. That is, the I2−I1 is the subtraction between the region 1 in the image I2 and the region 1 in the image I1 as well as the subtraction between the region 2 in the image I2 and the region 2 in the image I1. The rest can be done in the same manner.

(2) For the selection of N value, on one hand, the smaller the N value is, the fewer the pixel line required to be scanned, i.e. the smaller the region required to be scanned is; one the other hand, the shorter the time slot between the two frame images is, the smaller the offset error produced by moving objects is; while in such condition, the image quality will be a little worse. Therefore, in actual application, both the enhancement of image quality and the reducing of offset error produced by moving objects should be weighed for the selection of N value. The values that can achieve a balance of such two aspects is selected, which is preferably in a range of 1-72 pixel lines. Preferably, the value of N is 8, that is, every 8 scanned lines are taken as a region. In this regard, in an image of 480*680, there are 60 regions for subtracting.

Figure 6A:
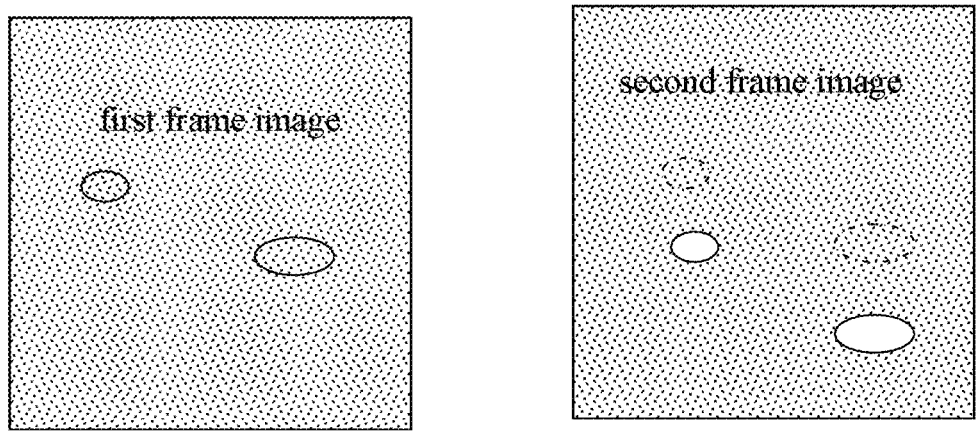
FIGS. 6a-b are contrast diagrams for the target detection results of the present invention and an un-partitioned method.
Figure 6B:
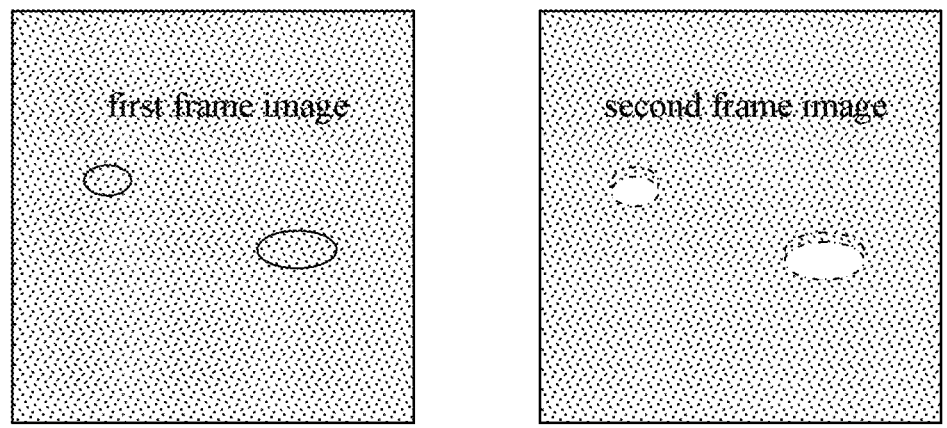

FIGS. 6a-b are contrast diagrams for the target detection results of the present invention and un-partitioned method. In detail, FIG. 6 is the result for image acquisition obtained through a traditional whole-image frame difference method without partition. The dash line in the figure represents an original location of the target to be detected and the solid line represents a location of the target to be detected after image scanning. Since the time taken for scanning a whole image is much longer than that taken for scanning a region in the present invention, a large deviation would be produced for the target to be detected between two frame images when the scanning for one frame image is finished, which brings about great influence on the detection accuracy. FIG. 6b is the two frame images obtained through the method and apparatus of the present invention. The dash line in the figure represents a location of the target in the image I1 and the solid line represents an actual location of the target in the image I2. It can be seen that the deviation of the target to be detected is very small which is nearly invisible.

By comparison, it is known that, in the target detection method of the present invention, the deviation of the target to be detected is relatively small. While in the traditional whole-image frame difference method, an expensive high-speed camera is employed to acquire images as well as to reduce the deviation shown in images as far as possible, thus bringing in great limitation to the actual application. In conclusion, the method and apparatus of the present invention have reduced the deviation produced by moving objects. Moreover, just a common image sensor can bring about very excellent detection effect, thus saving the cost greatly.

The above embodiments just show preferred implementations of the present invention. Though the relevant description is specific and detailed, it cannot be considered to limit the scope of protection of the present invention. It should be pointed out that an ordinary skill in the art can make various changes and improvements without departing the conception of the present invention, which will fall in the scope of protection of the present invention. As such, all the equivalent transformations and modifications practiced within the scope of the appended claims should fall in the scope of the appended claims of the present invention.

The invention claimed is:

1. A target detection method comprising the following steps:
controlling a modulated light emitting device to emit light pulse signals with a first light intensity and a second light intensity to a target to be detected and a background, wherein the first light intensity is not equal to the second light intensity, and the capabilities of reflecting the light pulse signals of the target to be detected and the background are different;
controlling an image sensor to acquire images of the target to be detected and the background, wherein the image sensor comprises a plurality of image acquisition regions, wherein two consecutive scans are performed on the same image acquisition region respectively in the first light intensity and in the second light intensity to obtain a first light intensity image and a second light intensity image which are then stored in corresponding locations in a first frame image and a second frame image respectively;
obtaining the first frame image and the second frame image after finishing the scanning for the plurality of image acquisition regions and distinguishing the target to be detected and the background by means of the first frame image and the second frame image;
in which regional grey scales for the target to be detected imaged in the first light intensity and in the second light intensity are quite different and regional grey scales for the background imaged in the first light intensity and in the second light intensity have little difference so that the distinguishing the target to be detected and the background is achieved through a difference image obtained by subtracting the first frame image from the second frame image.

2. The target detection method of claim 1, wherein the plurality of image acquisition regions are arranged continuously and correspond to a positive integral number of pixel lines or pixel rows of the image sensor respectively.

3. A target detection method, wherein comprising the following steps:
controlling a modulated light emitting device to emit light pulse signals with a first light intensity and a second light intensity to a target to be detected and a background, wherein the first light intensity is not equal to the second light intensity, and the capabilities of reflecting the light pulse signals of the target to be detected and the background are different;
controlling an image sensor to acquire images of the target to be detected and the background, wherein the image sensor comprises a plurality of image acquisition regions, wherein two consecutive scans are performed on the same image acquisition region respectively in the first light intensity and in the second light intensity to obtain a first light intensity image, a second light intensity image and a difference image of the first light intensity image and the second light intensity image, and the obtained difference image is stored in a corresponding location in a frame difference image;
obtaining the frame difference image after finishing the scanning for the plurality of image acquisition regions and distinguishing the target to be detected and the background using the frame difference image as regional grey scales for the target to be detected imaged in the first light intensity and in the second light intensity are quite different and regional grey scales for the background imaged in the first light intensity and in the second light intensity have little difference.

4. The target detection method of claim 3, wherein the plurality of image acquisition regions are arranged continuously and correspond to a positive integral number of pixel lines or pixel rows of the image sensor respectively.

5. A target detection apparatus comprising:
a modulated light emitting device, for emitting light pulse signals with a first light intensity and a second light intensity to a target to be detected and a background, wherein the first light intensity is not equal to the second light intensity, and the capabilities of reflecting the light pulse signals of the target to be detected and the background are different;

an image sensor, for acquiring images of the target to be detected and the background, wherein the image sensor comprises a plurality of image acquisition regions; and a control unit, for controlling the image sensor to perform two consecutive scans on the same image acquisition region respectively in the first light intensity and in the second light intensity to obtain a first light intensity image and a second light intensity image, wherein the first light intensity image and the second light intensity image are stored in corresponding locations in a first frame image and a second frame image respectively; obtaining the first frame image and the second frame image after finishing the scanning for the plurality of image acquisition regions and distinguishing the target to be detected and the background by means of the first frame image and the second frame image;

in which the control unit is further used for distinguishing the target to be detected and the background through a difference image obtained by subtracting the first frame image from the second frame image as regional grey scales for the target to be detected imaged in the first light intensity and in the second light intensity are quite different and regional grey scales for the background imaged in the first light intensity and in the second light intensity have little difference.

6. The target detection apparatus of claim 5, wherein the plurality of image acquisition regions are arranged continuously and correspond to a positive integral number of pixel lines or pixel rows of the image sensor respectively.

7. A target detection apparatus comprising:

a modulated light emitting device, for emitting light pulse signals with a first light intensity and a second light intensity to a target to be detected and a background, wherein the first light intensity is not equal to the second light intensity, and the capabilities of reflecting the light pulse signals of the target to be detected and the background are different;

an image sensor, for acquiring images of the target to be detected and the background, wherein the image sensor comprises a plurality of image acquisition regions; and a control unit, for controlling the image sensor to perform two consecutive scans on the same image acquisition region respectively in the first light intensity and in the second light intensity to obtain a first light intensity image, a second light intensity image and a difference image of the first light intensity image and the second light intensity image; wherein the obtained difference image is stored in a corresponding location in a frame difference image; obtaining the frame difference image after finishing the scanning for the plurality of image acquisition regions and distinguishing the target to be detected and the background by means of the frame difference image as regional grey scales for the target to be detected imaged in the first light intensity and in the second light intensity are quite different and regional grey scales for the background imaged in the first light intensity and in the second light intensity have little difference.

8. The target detection apparatus of claim 7, wherein the plurality of image acquisition regions are arranged continuously and correspond to a positive integral number of pixel lines or pixel rows of the image sensor respectively.

9. An image acquisition device comprising:

a modulated light emitting device, for emitting light pulse signals with a first light intensity and a second light intensity to a target to be detected and a background, wherein the first light intensity is not equal to the second light intensity, and the capabilities of reflecting the light pulse signals of the target to be detected and the background are different;

an image sensor, for acquiring images of the target to be detected and the background, wherein the image sensor comprises a plurality of image acquisition regions; and a control unit, for controlling the image sensor to perform two consecutive scans on the same image acquisition region respectively in the first light intensity and in the second light intensity to obtain a first light intensity image and a second light intensity image;

in which the control unit is further used for distinguishing the target to be detected and the background through a difference image obtained by subtracting the first frame image from the second frame image as regional grey scales for the target to be detected imaged in the first light intensity and in the second light intensity are quite different and regional grey scales for the background imaged in the first light intensity and in the second light intensity have little difference.

10. The image acquisition device of claim 9, wherein the control unit is also used for storing the first light intensity image and the second light intensity image in corresponding locations in a first frame image and a second frame image.

11. The image acquisition device of claim 9, wherein the control unit is further used for forming a difference image of the first light intensity image and the second light intensity image and storing the difference image in a corresponding location in a frame difference image.

12. The image acquisition device of claim 9, wherein the plurality of image acquisition regions are arranged continuously and correspond to a positive integral number of pixel lines or pixel rows of the image sensor respectively.

* * * * *